United States Patent [19]

Riley

[11] 4,279,066
[45] Jul. 21, 1981

[54] METHOD OF ATTACHING A SOLAR COLLECTOR PLATE TO A TUBE WATER WAY

[75] Inventor: Harry J. Riley, Wembley, Australia

[73] Assignee: S. W. Hart & Co. Pty. Ltd., Welshpool, Australia

[21] Appl. No.: 98,414

[22] Filed: Nov. 28, 1979

[30] Foreign Application Priority Data

Sep. 4, 1979 [JP] Japan .................................. 54-133474

[51] Int. Cl.³ ............................................ B23P 15/26
[52] U.S. Cl. ................................ 29/157.3 C; 165/183;
29/157.3 D; 29/157.3 A; 113/118 D; 113/118 A; 113/116 CC; 113/116 H; 113/116 UT
[58] Field of Search ........ 113/118 D, 116 CC, 118 C, 113/118 A, 118 B, 116 H, 116 UT; 29/157.3 R, 157.3 A, 157.3 B, 157.3 C, 157.4; 165/172, 176, 133, 183, 151

[56] References Cited

U.S. PATENT DOCUMENTS

| 518,767 | 4/1894 | Plecker .......................... 113/116 UT |
| 1,798,652 | 3/1931 | Booth .......................... 113/118 D X |
| 1,982,075 | 11/1934 | Smith .................................. 113/118 D |
| 2,550,174 | 4/1951 | Towner ....................... 113/118 D X |
| 2,591,994 | 4/1952 | Alexander ................... 113/118 D X |
| 3,224,503 | 12/1965 | Konanz ........................... 165/183 X |
| 4,158,908 | 6/1979 | Block et al. ....................... 113/118 C |
| 4,160,476 | 7/1979 | Ashton et al. .................... 113/118 C |

FOREIGN PATENT DOCUMENTS

| 504550 | 2/1927 | Fed. Rep. of Germany .... 113/116 CC |
| 2318180 | 10/1974 | Fed. Rep. of Germany .......... 165/183 |
| 403899 | 1/1934 | United Kingdom .................... 165/133 |

Primary Examiner—Nicholas P. Godici
Assistant Examiner—V. K. Rising
Attorney, Agent, or Firm—Pollock, Vande Sande & Priddy

[57] ABSTRACT

The present invention relates to a method of attaching a solar collector plate to a tube water way which comprises fluting the collector plate to a diameter appropriate for receiving the tube water way, fluting a backing strip to a diameter substantially the same as the diameter of the fluting of the collector plate, sandwiching the tube water way between the collector plate and backing strip in the fluting thereof, placing the assembly in a press and die, and, in the press and die, punching pierce tags from the collector plate into the backing strip and then closing the pierce tags. The present invention provides a method of bonding the collector plate to the tubes in a quick and easy manner which is suitable for mass production techniques.

6 Claims, 3 Drawing Figures

METHOD OF ATTACHING A SOLAR COLLECTOR PLATE TO A TUBE WATER WAY

The present invention relates to a method of attaching a solar collector plate to a tube water way.

Solar absorbers used in solar water heaters typically comprise a metal collector plate arranged to absorb solar radiation and become heated and a plurality of metal tube water ways in contact with the metal collector plate. In use, heat is transferred from the collector plate to water contained in the water ways.

In order to obtain good thermal efficiency it is desirable for the contact area of the tubes with the collector plate to be as large as possible. Also, it is desirable to use aluminium for the collector plate because of its relatively low cost and good conductivity characteristics. Normally, copper is used for the metal tube water ways.

Further, any method of bonding the collector plate to the tubes needs to be quick and easy to perform and suitable for mass production techniques.

In accordance with the present invention there is provided a method of attaching a solar collector plate to a tube water way which comprises fluting the collector plate to a diameter appropriate for receiving the tube water way, fluting a backing strip to a diameter substantially the same as the diameter of the fluting of the collector plate, sandwiching the tube water way between the collector plate and backing strip in the fluting thereof, placing the assembly in a press and die, and, in the press and die, punching pierce tags from the collector plate into the backing strip and then closing the pierce tags.

Preferably, the fluting in the collector plate and backing strip is of less diameter than the external diameter of the tube. In this way, the collector plate and backing strip are stretched over the tube in the press and die.

Also, it is preferred to place a lubricant in the flutings prior to assembly to provide the lubricant for the press and die. Typically, the lubricant takes the form of a bead of non-hardening heat transfer grease.

For assembly, the collector plate is prefereably placed on a base concave side up, the tube is placed in the fluting and then the fluted backing strip is placed over the tube.

The formation of the pierce tags is typically accomplished with one stroke of the press. Thus, each tube in a solar absorber is secured in place with one stroke of the press. The process is repeated for each tube in the solar absorber.

Further, the lubricant is squeezed in the pressing operation around the tube to take up any irregularities or crevices and thus provides enhanced thermal communications between the collector plate and the tube.

In the completed product efficient heat transfer is obtained over the whole circumference of the tube.

The present invention will now be described, by way of example, with reference to the accompanying drawings, in which.

Figure 1:
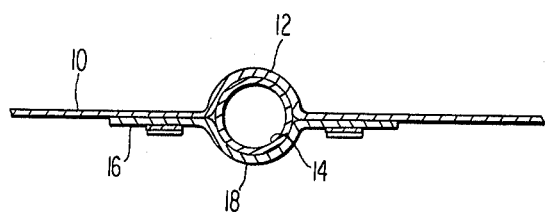
FIG. 1 is a transverse sectional view of a completed tube and collector assembly formed by the method of the present invention.

In the drawings, there is shown an aluminium collector plate 10 for a solar absorber of a solar water heater. The collector plate 10 is fluted to form a longitudinal groove 12 of generally circular configuration.

A circular copper tube 14 is located within the groove 12. A backing strip 16, which is fluted to form a longitudinal groove 18 of similar diameter to the groove 12, is mounted beneath the copper tube 14 as seen in FIG. 1.

Figure 2:
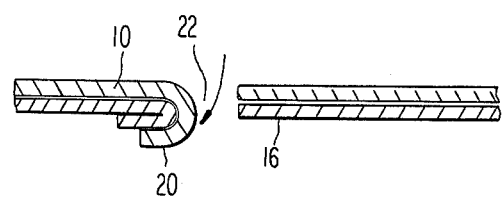
FIG. 2 is a longitudinal sectional view to an enlarged scale showing the form of the pierce tags produced by the method of the present invention.

The collector plate 10 and the backing strip 16 are connected to one another through pierce tags 20 formed in a press and die as described above. As can be seen in FIG. 2, the pierce tags 20 are formed by punching a hole 22 in the collector plate 10 and backing strip 16. The material displaced by the formation of the hole 22 is pushed back and then folded behind the backing strip 16.

Figure 3:
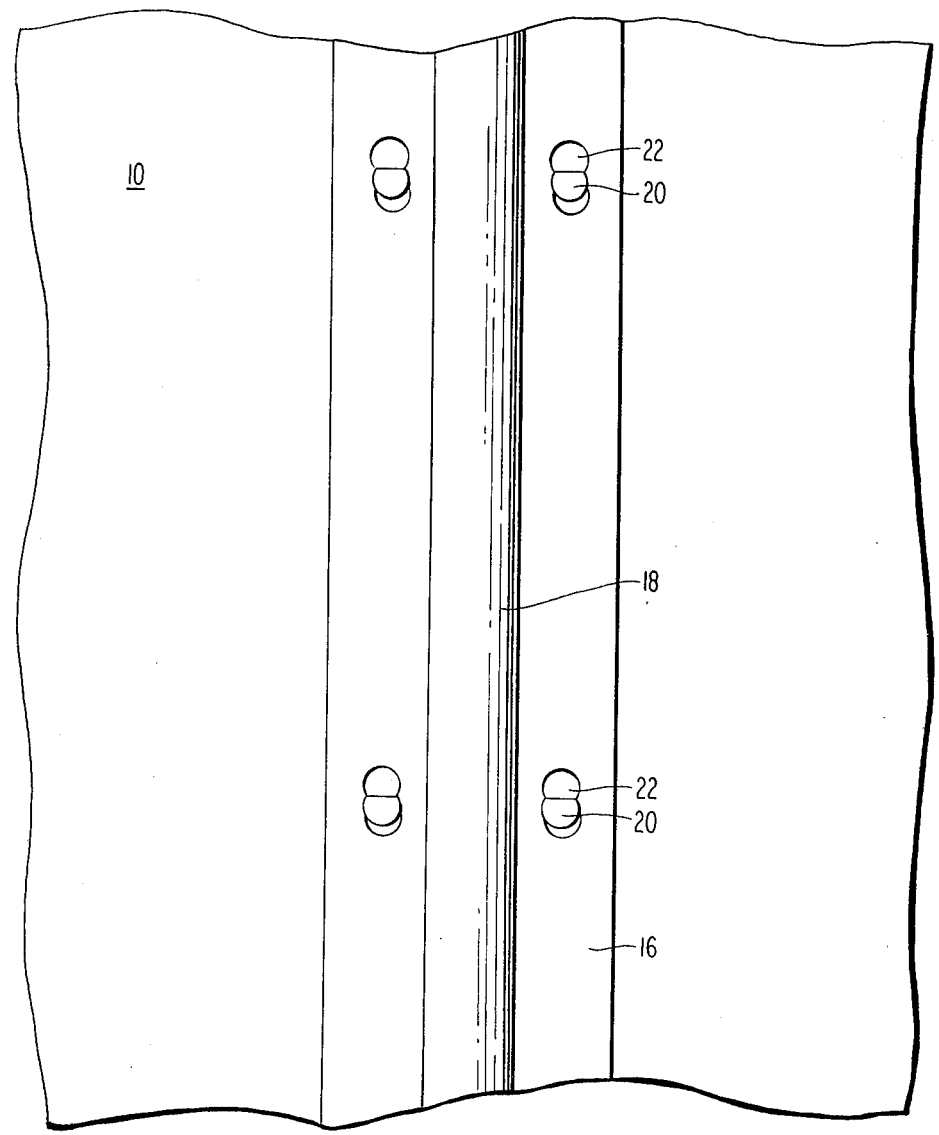
FIG. 3 is an underneath view of the assembly of FIG. 1.

As can be seen in FIG. 3, a plurality of holes 22 is formed in the collector 10 and backing strip 16 on each side of the tube 14. A backing strip 16 is provided for each tube 14 in the collector plate 10.

Modifications and variations such as would be apparent to a skilled addressee are deemed within the scope of the present invention.

I claim:

1. A method of attaching a solar collector plate to a tube water way which comprises fluting the collector plate to a diameter appropriate for receiving the tube water way, fluting a backing strip to a diameter substantially the same as the diameter of the fluting of the collector plate, sandwiching the tube water way between the collector plate and backing strip in the fluting thereof, placing the assembly in a press and die, and, in the press and die, punching pierce tags from the collector plate into the backing strip and then closing the pierce tags.

2. A method as claimed in claim 1, in which the flutings in the collector plate and backing strip are of less diameter than the external diameter of the tube.

3. A method as claimed in claim 1 or 2, in which lubricant is placed in the flutings prior to assembly.

4. A method as claimed in claim 3, in which the lubricant is a non-hardening heat transfer grease.

5. A method as claimed in claim 1, in which the formation of the pierce tags for the tube is accomplished by a single stroke of the press.

6. A method as claimed in claim 1, in which the collector plate and backing strip are formed of aluminium and the tube is formed of copper.

* * * * *